United States Patent [19]

van der Lely

[11] 4,231,305
[45] Nov. 4, 1980

[54] SOIL CULTIVATING MACHINE

[76] Inventor: Cornelis van der Lely, 7, Brüschenrain, Zug, Switzerland

[21] Appl. No.: 931,998

[22] Filed: Aug. 8, 1978

[30] Foreign Application Priority Data

Aug. 15, 1977 [NL] Netherlands .................. 7708957

[51] Int. Cl.³ .................. A01C 5/00; A01C 5/08
[52] U.S. Cl. .................. 111/7; 111/8; 111/52; 111/73; 111/85; 172/151; 172/177; 172/196; 172/552; 172/271
[58] Field of Search ............ 111/1, 6, 7, 8, 10, 111/11, 13, 14, 15, 52, 61, 62, 63, 70, 73, 80, 81, 85; 172/52, 54, 60, 48, 121, 123, 174, 177, 271, 450, 488, 540, 552, 553, 693, 690, 698, 699, 669, 705, 708, 748, 762, 151, 196; 47/1.5, 1.42, 1.44

[56] References Cited

U.S. PATENT DOCUMENTS

| 341,108 | 5/1886 | Preston | 111/13 |
|---|---|---|---|
| 487,722 | 12/1892 | Pernell | 172/552 |
| 1,135,091 | 4/1915 | Anderson | 172/177 |
| 1,914,915 | 6/1933 | Handler | 111/10 |
| 2,688,475 | 9/1954 | Small | 172/762 |
| 3,170,421 | 2/1965 | Norris et al. | 111/7 |
| 3,398,707 | 8/1968 | McClenny | 111/85 |
| 3,437,061 | 4/1969 | Wells | 111/1 |
| 3,692,120 | 9/1972 | Cline | 172/177 |
| 3,970,012 | 7/1976 | Jones | 172/450 |
| 4,023,507 | 5/1977 | van der Lely | 172/59 |
| 4,033,270 | 7/1977 | Bezzerides et al. | 111/10 |
| 4,048,929 | 9/1977 | Zumbahlen | 111/6 |
| 4,055,126 | 10/1977 | Brown et al. | 111/7 |
| 4,057,112 | 11/1977 | Taylor | 172/699 |
| 4,103,628 | 8/1978 | Gaston | 172/177 |
| 4,180,005 | 12/1979 | Zumbahlen | 111/85 |

FOREIGN PATENT DOCUMENTS

| 558622 | 12/1957 | Belgium | 47/1.42 |
|---|---|---|---|
| 6800520 | 7/1969 | Netherlands | 172/177 |
| 812732 | 4/1959 | United Kingdom | 47/1.5 |
| 144676 | 3/1962 | U.S.S.R. | 111/1 |

OTHER PUBLICATIONS

Anon. (1957), *Wonsover Model 96*, (advertizing leaflet), Norton-Portland Corporation, Portland, Maine, U.S.A., pub. Cushing & Nevell, Inc., N.Y.

Primary Examiner—Edgar S. Burr
Assistant Examiner—James R. Feyrer
Attorney, Agent, or Firm—William B. Mason

[57] ABSTRACT

A cultivating machine includes a forward row of subsoil tools and a plurality of elongated cultivating rollers having support plates to which soil penetrating T-section bars or knife edged bars are attached. To the rear of the cultivating rollers, a trailing roller is mounted on the frame and adjusting arms to the roller can be interconnected with the frame to raise or lower same and thereby set the soil working levels of the subsoil. Each cultivating roller can have its soil penetrating depth controlled through pivot arm connections that move the roller through an arc centered on the pivot axes which extend transverse to the direction of machine travel. The machine frame has a coupling that is connectable to the lifting hitch of a tractor and tanks of liquid soil treating material are mounted on the tractor adjacent the coupling. Spraying booms between the rollers and at the rear of the tools are in communication with the tanks and seed drills at the rear of the rollers enable cultivation, soil treatment and planting to be done in one pass. The cultivating rollers ensure that the material sprayed is thoroughly mixed with worked soil and vegetation cut by the rollers.

11 Claims, 9 Drawing Figures

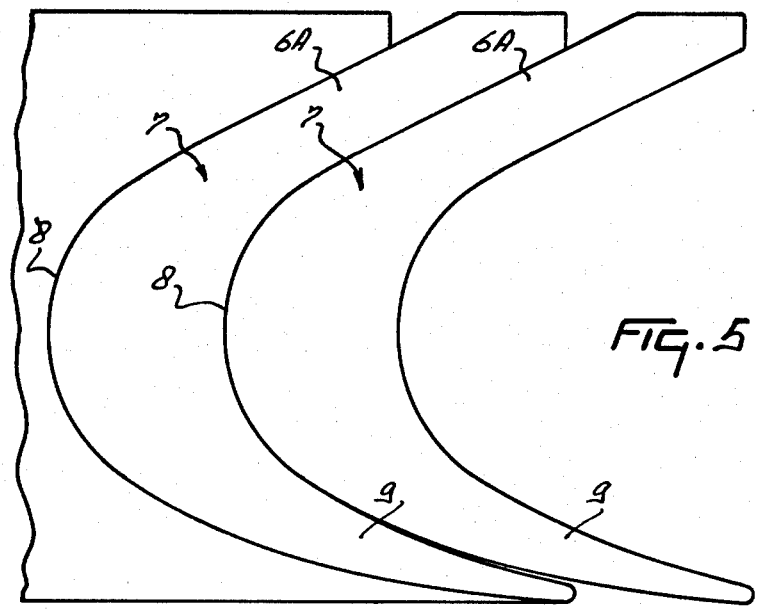
FIG. 5
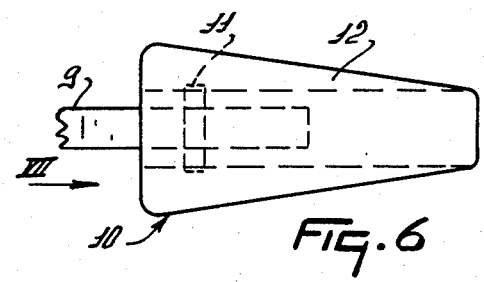
FIG. 6
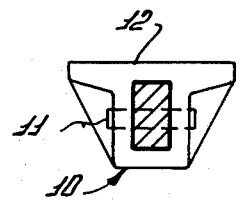
FIG. 7
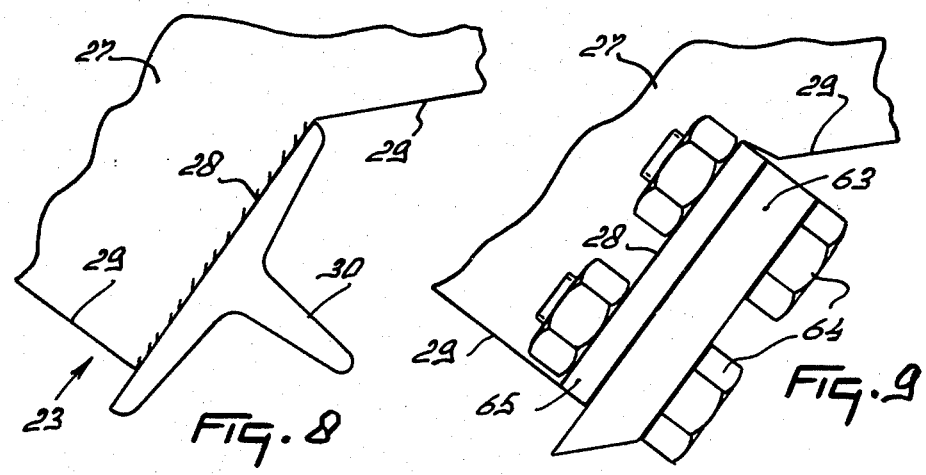
FIG. 8
FIG. 9

SOIL CULTIVATING MACHINE

According to a first aspect of the present invention there is provided a soil cultivating machine comprising a plurality of members which are adapted to penetrate the soil and are arranged in a row extending transversely of the intended direction of operative travel of the machine, there being further provided a roller, disposed behind the row of soil penetrating members, and spraying means, disposed between the row of soil penetrating members and the roller.

According to a second aspect of the present invention there is provided a soil cultivating machine comprising at least one member which is adapted to penetrate the soil, spraying means being provided behind the soil penetrating member, with respect to the intended direction of operative travel of the machine, and at least two soil working rollers followed by at least one seed drill being provided behind the spraying means.

According to a third aspect of the present invention there is provided a soil cultivating machine comprising a member which is adapted to penetrate the soil, a roller disposed behind the soil penetrating member and a seed drill disposed behind the roller, the soil penetrating member, a support plate of the roller and a delivery part of the seed drill being disposed substantially on a straight line which extends in the intended direction of operative travel of the machine.

According to a fourth aspect of the present invention there is provided a soil cultivating machine comprising at least one member, which is adapted to penetrate the soil, there being provided, in order behind the soil penetrating member, with respect to the intended direction of operative travel of the machine, a cultivating member for working the soil to a given depth, a device for applying fertilizer to or in the soil, and at least one seed drill.

According to a fifth aspect of the present invention there is provided a soil cultivating machine comprising means for applying chemicals onto or into the soil, this means comprising two booms disposed at a distance one behind the other with respect to the intended direction of operative travel of the machine.

According to a sixth aspect of the present invention there is provided a soil cultivating machine comprising a pair of rollers which extend transversely of the direction of movement and are rotatable about substantially horizontal axes, a spraying boom being disposed, as viewed on plan, between the rollers.

Using a machine in accordance with the present invention, the subsoil can be effectively loosened, after which a herbicide and/or a pesticide can be spread on the loose earth for killing weed seeds and/or insects contained therein. Subsequently the soil is intensively turned up over the whole working width of the machine so that crop remnants and weeds can be mixed up with the earth in a manner such that a mulching cover is formed in which seeds and/or plants can develop under optimum conditions.

For a better understanding of the present invention and to show how it may be carried into effect, reference will now be made by way of example only, to the accompanying drawings, in which:

FIG. 5 illustrates schematically how the working members of FIG. 4 may be produced;

FIG. 6 shows on an enlarged scale a component of the working member of FIG. 4;

FIG. 7 is an elevational view in the direction of the arrow VII of FIG. 6;

FIG. 8 illustrates on an enlarged scale a detail of the machine of FIGS. 1 to 3; and FIG. 9 shows an alternative embodiment of the detail shown in FIG. 8.

Figure 4:
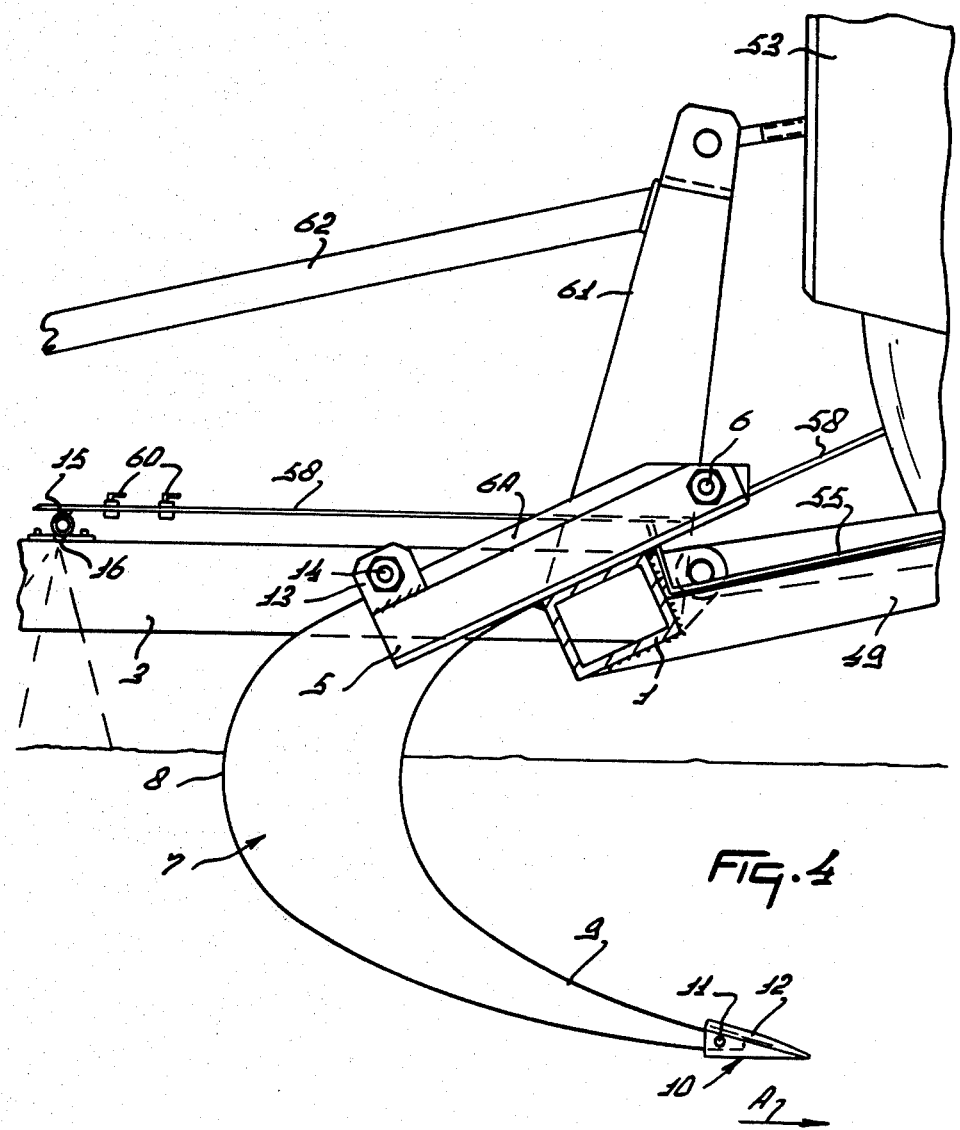
FIG. 4 is an enlarged side elevation of a working member of the machine of FIGS. 1 to 3.

The agricultural implement or machine shown in the Figures comprises a frame having two frame beams 1 and 2 extending transversely of the intended direction of operative travel of the machine, which is indicated by an arrow A. The frame beams 1 and 2 are horizontal and substantially parallel to one another. The front frame beam 1 has a rectangular cross-section, the longer sides of the rectangle being inclined upwardly and forwardly, whereas the rear frame beam 2 has a square cross-section and is disposed so that one of its diagonals extends substantially vertically. The ends of the frame beams 1 and 2 are interconnected by tie beams 3 extending in the direction A. Bracing members 4 are arranged between the tie beams 3 and the beam 2. The front frame beam 1 is provided, on its upper surface, near its ends and at equal intervals along its length with supports 5. These supports 5 are channel-shaped, i.e. they are U-shaped in cross-section, the web of each support 5 being secured to the frame beam 1 so that its limb extends upwardly (FIG. 4). The longitudinal center line of each support 5, which is parallel to the longer sides of the rectangular cross-section shape of the frame beam 1, is inclined by about 25° to the horizontal. At the front between the limbs of each support 5 there is arranged by means of a pivot bolt 6 a substantially parallel-sided upper portion 6A of a member in the form of a hook-like tine 7 which is adapted to penetrate the soil. These tines 7 comprise plates punched from sheet material with a thickness of about 20 mms. In use of the machine the tines act as subsoil agitators loosening the subsoil. The portion 6A constitutes a fastening portion and extends over substantially the whole length of its support 5. The front side of the portion 6A, like the front side of the U-shaped support 5, is bevelled (FIG. 4). The portion 6A merges into a central portion 8 having a regular curve and being the broadest near the center, the width progressively decreasing away from the center on either side. Thus the tine has generally the shape of a sickle. The portion 8 merges into a forwardly extending portion 9 which ends in a tip. The end of the portion 9 is located substantially vertically beneath the pivot bolt 6. As stated above, the tines 7 are made from sheet material and their special design enables them to be punched from a single sheet without appreciable loss of material, since the front edge of one tine can bear over the whole of its length on the rear edge of an adjacent tine (see FIG. 5). On the end of the portion 9 there is provided a removable tip 10 of wear-resistant material, which is fastened to the tine 7 by a transverse pin 11 near its broader end. The tip 10 has a flat part 12 on its upper side having a substantially trapezoidal shape, viewed on plan. The part 12 projects to each side of the tine and extends substantially perpendicular to the side face of the tine (FIGS. 6 and 7).

Near its rear end, each support 5 has tags 13 which hold between them the rear edge of the portion 6A of the tine 7, this portion 6A being held in place by a bolt 14 arranged between the tags. The bolt 14 is formed to act as a shear pin so that, as the tine 7 moves through the soil, the bolt can break if excessive forces are exerted on the tine, the tine then turning upwardly about the bolt 6 at the front of the support 5. Some distance behind the tines, between the tie beams 3, is mounted a spraying boom 15 which extends transversely of the direction A and is provided with spraying nozzles 16 positioned directly behind the tines 7 and, moreover, midway between each two adjacent tines, viewed in the direction of movement A.

The spraying nozzles 16 are directed so that the sprayed fluid is sprayed downwardly and slightly to the rear. Behind the spraying boom 15 the tie beams 3 each carry a support plate 17 on its outer side. Each support plate 17 projects above its tie beam. At the same vertical level as the tie beams 3, an arm 19 is pivotally connected to each support plate 17 by a stub shaft 18. Each of the arms 19 tapers upwardly and has an opening at its upper end for receiving a bolt 20, which can also be received in any one of a plurality of holes 21 provided in the upper region of each support plate 17 and arranged to an arc centered on the longitudinal center line of the stub shaft 18. The stub shafts 18 on each side of the machine are in line with one another. The lower end of each arm 17 is provided with bearings in which a stub shaft 22 is freely rotatable. The stub shafts 22 are connected with a roller 23 extending transversely of the direction A.

Figure 1:
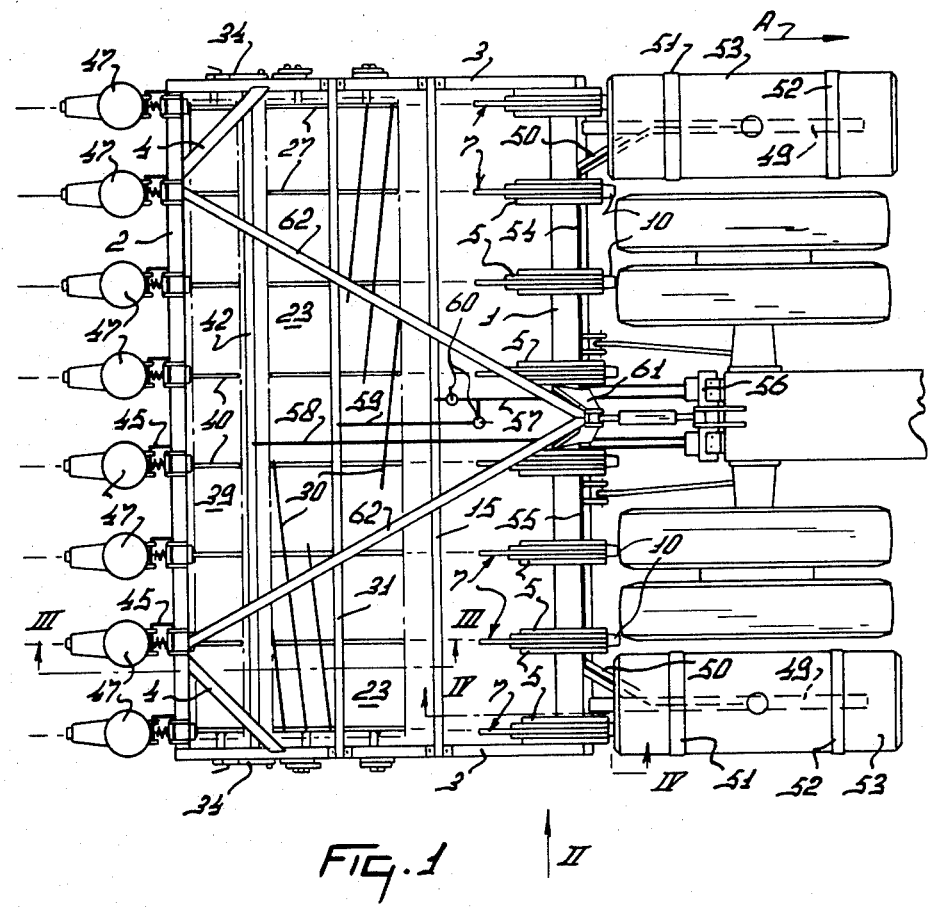
FIG. 1 is a plan view of a soil cultivating machine.

Some distance behind the support plates 17 the tie beams 3 are provided with upwardly extending support plates 24, the shape of which corresponds with that of the plates 17, these plates 24 being arranged in the same manner. An arm 26 is pivotally connected to each of the plates 24 by a stub shaft 25. The arms 26 are pivotable in the same manner as the arms 19 about the aligned stub shafts 25 and can also be fixed in a plurality of positions. The lower ends of the arms 26 are provided with bearings for the stub shafts 22 of a second roller 23. The stub shafts 22 are located at a lower level than those of the first roller. The two rollers 23 operate, as a pair, as cultivating members and are adjustable by means of the arms 19 and 26 so that the distance between them can be varied. In the position shown in the Figures, the rollers are at their minimum distance apart. This minimum distance is about 5 cms. The diameter of each of the rollers is about 40 cms. Each roller 23 is provided at its ends and at equal intervals between its ends with support plates 27. Each support plate 27 has a serrated periphery constituted by alternate straight short sides 28 and straight long sides 29. The short sides 28 and the long sides 29 are in the same position relative to the center of a support holding the rotary axis of the roller. Each short side 28 is at an angle of 25° to 30° to the radial line going through its junction with the next following long side 29 and slopes forwardly of that radius with respect to the operative direction of rotation of the roller. The long sides are substantially tangential to the rotary axis of the roller. Each long side 29 is about 3-times as long as each short side 28. To each of the short sides 28 is fastened the cross-piece of a T-section iron 30 so that part of that cross-piece projects beyond the short side and hence beyond the periphery of the support 27. The path described by the projecting end of the cross-piece has a greater diameter than the path described by the radially outer end of the upright of the T-section. In total eight T-section irons 30 are provided on each roller 23. The irons 30 of the two rollers extend helically in opposite senses about the rotary axes of the rollers, and serve as the sole interconnection between the supports 27 of each roller. On the upper surface of the tie beams 3 and, as viewed on plan, between the rollers 23, there is arranged a second spraying boom 31 extending, like the boom 15, across the whole working width of the machine. The boom 31 has spraying nozzles 32 which spray the sprayed fluid in the direction towards the rear roller 23. Directly behind the rear roller 23 are situated downwardly and rearwardly inclined arms 34 which are pivoted to the tie beams 3 by stub shafts 33. Near its rear end, each arm 34 is provided with an ear 35, through which a pin 36 can be passed, which can fit into any one of a plurality of holes 37 in a plate 38 fastened to the lower surface of each tie beam 3. Between the ends of the arms 34 is provided a third roller 39 which is mounted in a freely rotatable manner. The roller 39 comprises a plurality of support plates 40 located, as are the supports 27 of the rollers 23, in line behind the tines 7, as is shown in FIG. 1. The support plates 40 are interconnected by circular bars 41 which extend substantially parallel to the rotary axis of the roller. Within the working range of the roller 39 and in front of it there is arranged between the tie beams 3 a third spraying boom 42 having spraying nozzles 43 located at the level of the support plates 40 of the roller 39 and directed so that during operation the sprayed fluid is ejected rearwardly and downwardly towards the roller 39.

On the rear frame beam 2, on its rear surface and in line with the support plates of the respective rollers 23 and 29 and of the tines 7 in front of them pairs of tags 44 are provided for pivotally supporting brackets 45 one above the other. The rear ends of the brackets 45 are pivotally connected between supports 46 provided at the front of precision seed drills 47, which may be of known construction. The brackets 45 disposed one above the other constitute a parallelogram structure. A compression spring 48 is arranged between the rear end of the upper bracket 45 and the front end of the lower bracket to absorb part of the weight of the seed drill.

Figure 2:
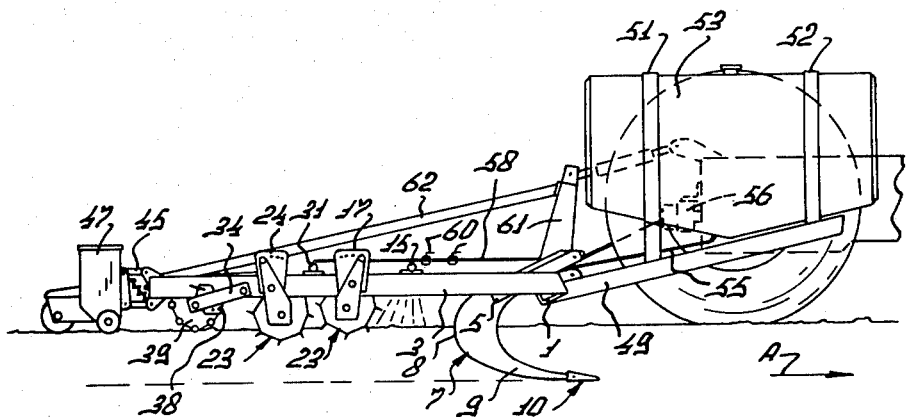
FIG. 2 is an elevational view in the direction of the arrow II in FIG. 1.
Figure 3:
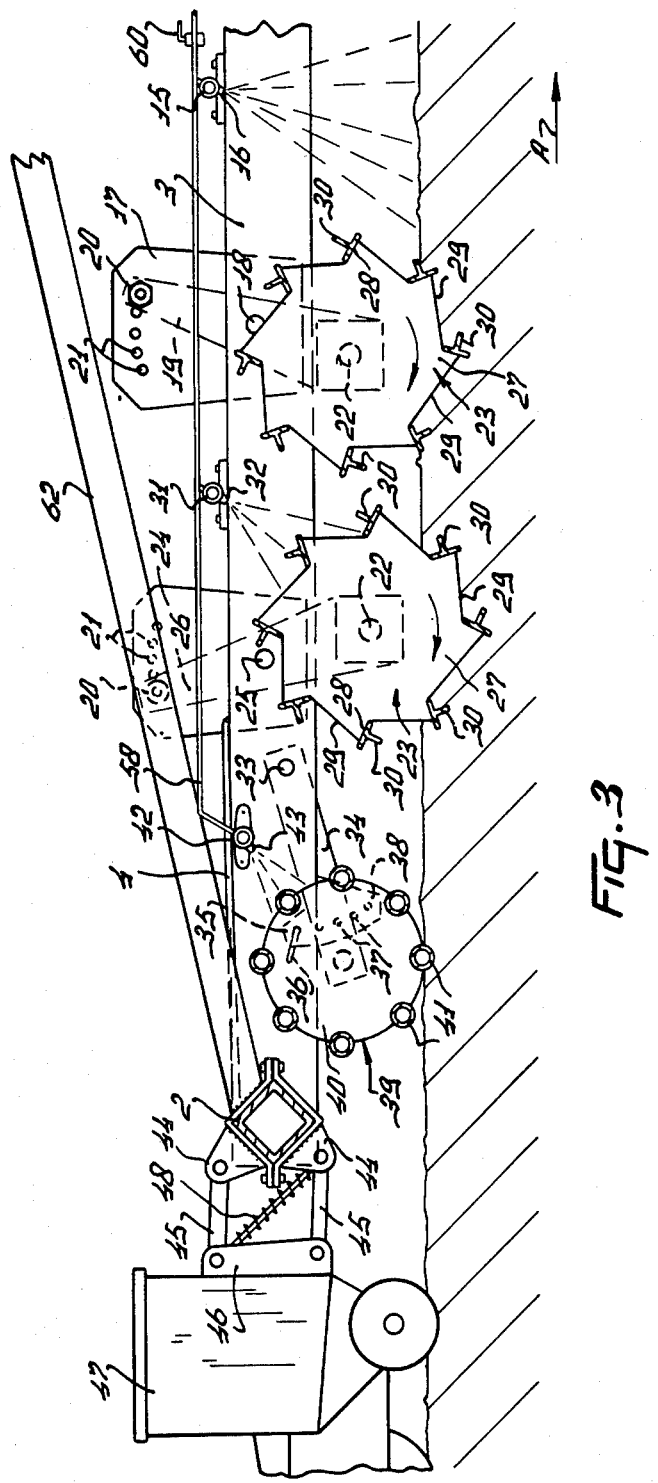
FIG. 3 is an enlarged side elevation of the machine shown in FIGS. 1 and 2.

Some distance from its ends, near the fastening location of each outermost tine 7, the front frame beam 1 is provided with a forwardly extending support 49, the connection of which to the frame beam 1 is reinforced by a bracing member 50, which is arranged inboard of the support and extends towards the front frame beam 1 in an inclined position. Each of the supports 49 is fitted, by means of clamping straps 51 and 52, with a hopper or tank 53, which extends over the whole length of its support 49 and which has a height exceeding its width. The bottom of most of the front portion of the tank 53 bears on the support 49 which is inclined upwardly from the front frame beam 1. From the center of the tank 53, the bottom of the tank is inclined upwardly to the rear (FIG. 2). On the bottom of each tank 53, near the center, is provided a delivery conduit 54 and 55 respectively which is guided along the frame beam 1 and has, near the center of the frame beam, a forwardly directed section connected with a pump 56, which can be coupled with the power take-off shaft of a tractor propelling the machine. A second conduit 57 and 58 respectively extends from the pump 56 to the front spraying boom 15 and to the rear spraying boom 42 respectively. The middle spraying boom 32 communicates through a conduit 59 with a conduit 57. The conduit 57 and the conduit 59 include stop cocks 60 by means of which one or both of the front two spraying booms can be switched on or off at will.

Near its center the front frame beam 1 is provided with a trestle 61 for hitching the machine to the three-point lifting device of a tractor. The top region of the trestle 61 is secured to the rear frame beam 2 by rearwardly diverging supports 62.

The machine described above operates as follows:

For operation the machine is attached by the trestle 61 to the three-point lift of the tractor and, as stated above, the pumps 56 are drivably connected with the power take-off shaft of the tractor. The working depth of the hook-like tines 7 operating as sub-soil agitators can be adjusted by altering the level of the rear roller 39 serving, in addition, as a support. This alteration is performed by adjusting the upwardly displaceable arms 34. The distance between the two front rollers 23 can be adjusted by means of the setting arrangement comprising the arms 19 and 26 and, by the same means, their working depth can be adjusted, for example so that the depth of the front roller is the smaller. By varying the relative positions of the rollers the intensity of their co-operation can be affected. During a run of the machine, soil is torn up over the working width of the machine in adjacent strips by the tines 7, after which, directly in front of the front roller 23, chemicals such as herbicides and/or pesticides are spread on the worked strip through the spraying nozzles 16 of the spraying boom 15. Subsequently the sprayed chemicals are intensively mixed into the earth by the two consecutive rollers 23, while any plant remnants and roots can be cut up by the aid of the T-section irons 30 and mixed with the earth. It is advantageous that the rollers 23 do not have a centrally extending carrier or support shaft, so that earth can readily pass into and out of the rollers. If desired, a herbicide or a pesticide may again be added through the spraying boom 31. In certain circumstances, it has been found that good results are obtained with the front roller 23 working at a depth of 6 to 7 cms and the rear roller 23 working at a depth of about 10 cms. Into the strip of soil thus worked a fertiliser, such as liquid manure, is subsequently introduced through the spraying boom 42 and by the rear roller 39 and the worked earth is consolidated by the bars 41. Then each of the seed drills 47 introduces seeds through their sowing pipes into the worked and prepared soil. After the operations described the strips of soil torn up by the tines 7 are slightly packed by the support plates 27 and 40 of the respective rollers 23 and 39 located directly behind the tines 7. This prevents the seeds introduced by the respective seed drills 47 into the furrows from being deposited at an excessive depth in the soil. Instead of the T-section irons 30, each of the soil working rollers 23 may be provided with knife-like bars 63, which are fastened by bolts 64 (see FIG. 9) to bent-over tags 65 located at the short sides 28 of the serrated periphery of the support plates 27. Like the cross-piece of the T-sections 30, one side of each knife-like bar 63 is at an angle of about 30° to a radial line from the rotary axis of the roller. In this way the cutting effect of the bars of the roller can be materially enhanced. If a tine 7 turns about its bolt 6 after rupture of the bolt 14, this occurs without the tine being first pressed more deeply into the soil, since as stated above the bolt 6 is located substantially vertically above the tip of the tine.

The specific disposition of the hoppers or tanks 53 on the sides of the machine and in front of the coupling points for the attachment to the tractor ensures that the machine can be readily lifted by the lifting device, when the machine has to be moved into a transport position. On sloping fields, an excessive unilateral load is avoided by using two hoppers or tanks. Since the hoppers or tanks are located by their outer sides in line with the outer side of the frame (FIG. 1), the assembly has a compact structure. If desired the spraying boom 15 may be omitted so that the machine will still be more compact.

While various features of the machine that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil cultivating machine comprising a frame and soil penetrating tools being supported on the frame, spraying means mounted on said frame and positioned to the rear of said tools, a plurality of soil cultivating rollers journalled on the frame and at least one of said rollers comprising soil penetrating means, said one roller being located behind said spraying means, whereby material can be sprayed in advance of the roller and mixed into the soil with vegetation cut by the soil penetrating means, said spraying means comprising spaced apart spraying booms with valve means and said booms being operatable independently of one another, one spraying boom with rearwardly directed spraying nozzles being located in advance of said roller and seed drills being mounted behind that roller, said roller having a plurality of support plates and a periphery of elongate members, each tool being a tine pivotably connected to the frame adjacent the end of a substantially rectangular upper portion of the tine, a shear pin interconnecting said upper portion to the frame to prevent pivotal movement of the tine during normal operation, and said upper portion extending upwardly and forwardly at about 45° to the vertical.

2. A soil cultivating machine comprising a frame and soil penetrating tools being supported on the frame, spraying means mounted on said frame and positioned to the rear of said tools, a plurality of soil cultivating rollers journalled on the frame and at least one of said rollers comprising soil penetrating means, said one roller being located behind said spraying means, whereby material can be sprayed in advance of the roller and mixed into the soil with vegetation cut by the soil penetrating means, said spraying means comprising spaced apart spraying booms with valve means and said booms being operatable independently of one another, one spraying boom with rearwardly directed spraying nozzles being located in advance of said roller and seed drills being mounted behind that roller, said roller having a plurality of support plates and a periphery of elongate members, each tool being a tine pivotally connected to the frame adjacent the end of a substantially rectangular upper portion of the tine, a shear pin interconnecting said upper portion to the frame to prevent pivotal movement of the tine during normal operation, and said shear pin being located above the upper edge of the tine.

3. A soil cultivating machine as claimed in claim 2, in which said upper portion is disposed between upwardly extending limbs of a channel-shaped support on the frame and said tine is pivotally connected adjacent the front end of said support, said support having ears at the rear end thereof and said shear pin being passed through said ears.

4. A soil cultivating machine as claimed in claim 2, in which said frame has coupling means and at least one externally-mounted tank for growth-stimulators communicates with said spraying means, said tank being positioned in front of the coupling means and said coupling means being positioned to receive a three point lifting device of a tractor.

5. A soil cultivating machine as claimed in claim 2, in which each roller is supported on corresponding arms which are pivotably mounted on said frame.

6. A soil cultivating machine as claimed in claim 5, in which said arms are settable in any one of a plurality of positions to fix the rollers relative to said frame in different positions.

7. A soil cultivating machine as claimed in claim 2, at least one of the cultivating rollers has support plates and elongate T-section members, one side of the T-section members being fitted to said plates.

8. A soil cultivating machine as claimed in claim 7, in which the support plates have serrated peripheries, each serration comprising a short side and a long side, the short side joining the long side of an adjacent serration.

9. A soil cultivating machine as claimed in claim 8, in which the length of the long side of each serration is about 2.5-times the length of said short side, said short side being at an angle of about 30° to a radial line extending through the junction between the short side and said long side.

10. A soil cultivating machine as claimed in claim 2, in which each tool comprises a tine made from sheet material, the front and rear edges of said tine being curved.

11. A soil cultivating machine as claimed in claim 10, in which each tine is hook-shaped and comprises an upper forwardly inclined, straight end portion that merges through a regular curve with a forwardly directed lower end portion and the latter portion terminating in a tip, the portions of the tine adjacent the end portions having the greatest width.

* * * * *